US008584166B2

(12) United States Patent
Gunda et al.

(10) Patent No.: US 8,584,166 B2
(45) Date of Patent: Nov. 12, 2013

(54) PROBABILISTIC-BASED CONTENT RECOMMENDER

(75) Inventors: Siddhartha Gunda, Eluru (IN); Nilanjan Roy, New Delhi (IN); Muhil Rajamanickam, Madurai (IN); Vijay Prabhu Baskaran, Chennai (IN); Jubish Cheriya Parambath, Chennai (IN); Anand N. Sankaran, Chennai (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 190 days.

(21) Appl. No.: 13/105,072

(22) Filed: May 11, 2011

(65) Prior Publication Data

US 2012/0291057 A1 Nov. 15, 2012

(51) Int. Cl.
*G06F 3/00* (2006.01)
*G06F 13/00* (2006.01)
*H04N 5/445* (2011.01)

(52) U.S. Cl.
USPC .................. 725/45; 725/37; 725/39; 725/44; 725/46; 725/47

(58) Field of Classification Search
USPC .......................................... 725/37, 39, 44–47
See application file for complete search history.

(56) References Cited

U.S. PATENT DOCUMENTS

| | | | | |
|---|---|---|---|---|
| 7,051,352 | B1 * | 5/2006 | Schaffer | 725/39 |
| 2002/0178448 | A1 * | 11/2002 | Te Kiefte et al. | 725/46 |
| 2004/0001081 | A1 * | 1/2004 | Marsh | 345/721 |
| 2008/0222680 | A1 * | 9/2008 | Murakami | 725/46 |
| 2010/0125544 | A1 * | 5/2010 | Lee et al. | 706/54 |

* cited by examiner

*Primary Examiner* — Nasser Goodarzi
*Assistant Examiner* — Kyu Chae

(57) ABSTRACT

A method including providing a television service to customers; identifying a customer when the customer uses the television service; tracking content viewed by the customer; calculating probabilities based on the customer's viewing of contents, wherein the probabilities pertain to features applicable to the viewed contents and the features include genres of the viewed contents; selecting one or more upcoming contents, available at a future date to the customer, to recommend to the customer based on one or more features applicable to the upcoming content that correspond to one or more features applicable to the viewed contents; and providing a user interface to permit the customer to select from the one or more upcoming contents recommended to the customer.

20 Claims, 11 Drawing Sheets

PROBABILISTIC-BASED CONTENT RECOMMENDER

BACKGROUND

Service providers (SPs) are continually trying to improve customer relationship management (CRM) systems. CRM systems may enhance the quality of service provided by service providers as well as improve customer experience and satisfaction.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

The term “content” or “contents,” as used herein, is intended to be broadly interpreted to include visual data, audio data, a combination of audio data and visual data, or other form of media content. By way of example, content may include television content and Internet content. Television content may include live-programming (e.g., a live broadcast, etc.), movies, sports, television shows, video-on-demand (VoD) content, premium channel content, and pay-per-view (PPV) content. Internet content may include podcasts, web sites, etc. The content may be in various formats, such as, for example, standard definition, high-definition, 3-D, etc.

According to an exemplary embodiment, a probabilistic-based content recommender may use past customer viewership of contents as a basis to generate recommendations of content to the customer. According to an exemplary embodiment, the probabilistic-based content recommender may use metadata pertaining to content to identify features of the content and generate the recommendations. For example, according to an exemplary implementation, the metadata may include title, broadcaster, air-time, air-date, program identifier, genre and/or sub-genre, cast and credit details (e.g., actors, director, producer, etc.), synopsis (e.g. plot), language, and content rating (e.g., mature, children, etc.). According to an exemplary embodiment, the probabilistic-based content recommender may include a self-learning function that adapts the selection of recommendations based on customer viewership (e.g., recommended content and non-recommended content).

According to an exemplary embodiment, the probabilistic-based content recommender may be implemented within a service provider network that provides television service to its customers. According to such an embodiment, the recommended content may be selected from immediately available content and content available in the future (e.g., upcoming content). Additionally, or alternatively, the probabilistic-based content recommender may be implemented within a service provider network that provides Internet service and/or mobile service to its customers. The probabilistic-based content recommender may generate recommendations that are customer-specific. For example, the customer may be identified when using a service based on a manual log-in or automatically identifier (e.g., a device identifier that is mapped to the customer).

Figure 1:
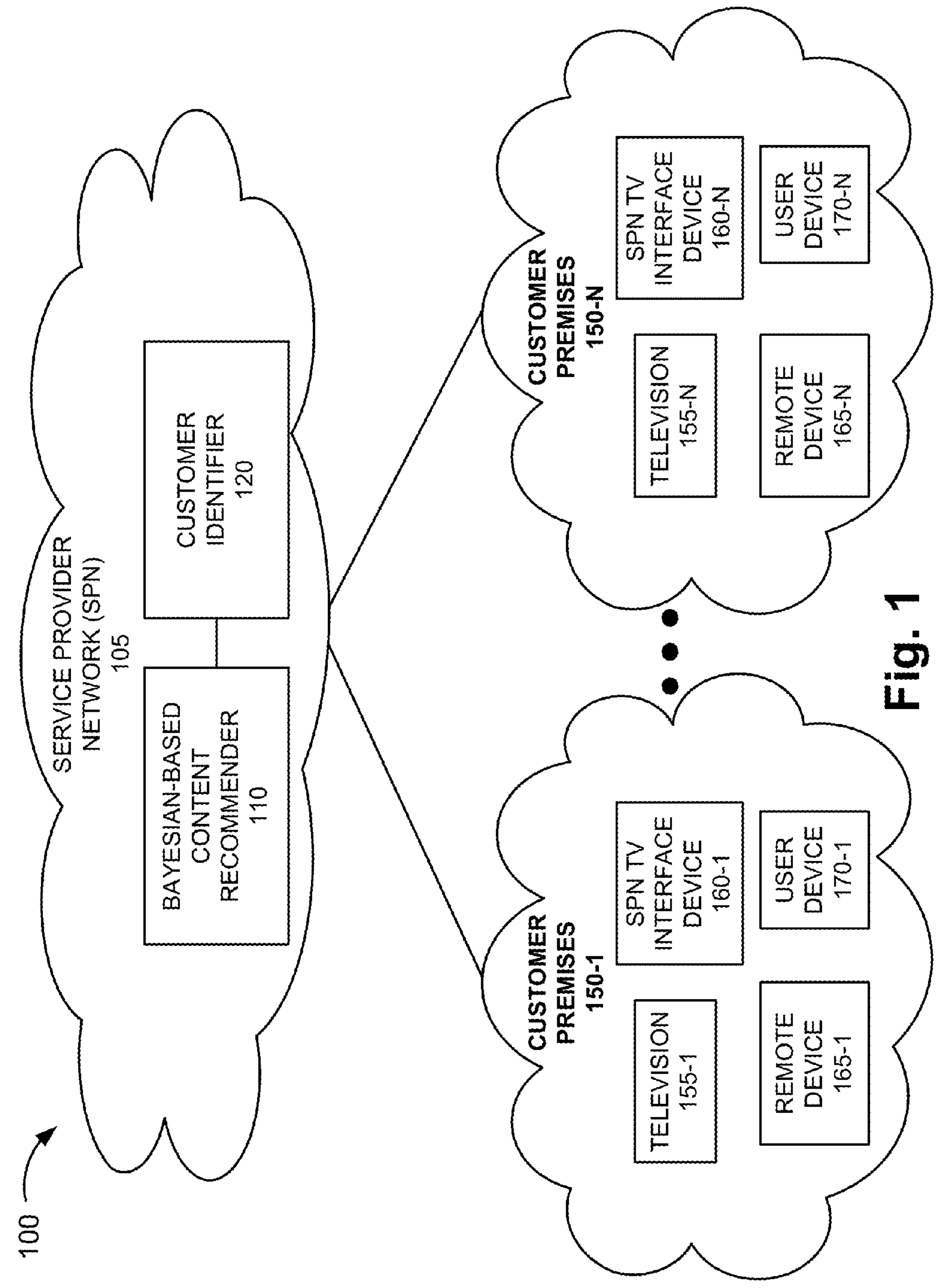
FIG. 1 is a diagram illustrating an exemplary environment in which an exemplary embodiment of a probabilistic-based content recommender may be implemented.

FIG. 1 is a diagram illustrating an exemplary environment 100 in which an exemplary embodiment of a probabilistic-based content recommender may be implemented. As illustrated in FIG. 1, environment 100 may include a service provider network (SPN) 105 and customer premises 150-1 through 150-N (referred to as customer premises 150). Service provider network 105 may include, among other devices, a Bayesian-based content recommender 110 and a customer identifier 120. Customer premises 150 may include, among other devices, televisions (TVs) 155-1 through 155-N (referred to generally as TV 155 or TVs 155), SPN TV interface devices 160-1 through 160-N (referred to generally as SPN TV interface device 160 or SPN TV interface devices 160), remote devices 165-1 through 165-N (referred to generally as remote device 165 or remote devices 165), and user devices 170-1 through 170-N (referred to generally as user device 170 or user devices 170).

The number of devices and networks, and the configuration in environment 100 is exemplary and provided for simplicity. In practice, according to other embodiments, environment 100 may include additional devices, fewer devices, different devices, and/or differently arranged devices, than those illustrated in FIG. 1. For example, SPN TV interface device 160 and TV 155 may be implemented as a part of user device 170. Additionally, or alternatively, for example, customer premises 150 may not include one or more of TV 155, SPN TV interface device 160, remote device 165, or user device 170.

Additionally, or alternatively, environment 100 may include additional networks, fewer networks, and/or differently arranged networks, than those illustrated in FIG. 1. For example, customer premises 150 may include a local area network (LAN). Also, according to other embodiments, one or more functions and/or processes described as being performed by a particular device may be performed by a different device or a combination of devices. For example, according to an embodiment, a function or a process described as being performed by two or more devices may be performed by a single device. Conversely, according to another embodiment, a function or a process described as being performed by a single device may be performed by two or more devices or by a different device. By way of example, one or more functions and/or processes described as being performed by semantic-based search engine 110 may be performed by customer identifier 120 or vice versa. Environment 100 may include wired and/or wireless connections among the devices illustrated.

Service provider network 105 may include a network that distributes or makes available a service, such as, television service. Service provider network 105 may also include a network that distributes or makes available mobile service and/or Internet service. Service provider network 105 may be a satellite-based network and/or a terrestrial-based network. Although not illustrated, service provider network 105 may include, for example, content distribution devices, content storage devices, application servers, billing devices, security devices, etc.

Bayesian-based content recommender 110 may generate content recommendations to customers. According to an exemplary embodiment, Bayesian-based content recommender 110 may calculate probabilities associated with features pertaining to contents viewed by customers. For example, as previously described, metadata (e.g., title, synopsis, etc.) associated with content may be used to identify features of the content. Bayesian-based content recommender 110 may calculate probabilities for upcoming content based on the features identified with respect to the customer-viewed content. Bayesian-based content recommender 110 may then calculate scores pertaining to the upcoming content based on the calculated probabilities pertaining to the upcoming content. Bayesian-based content recommender 110 may select upcoming content that have the highest scores and yield the highest likelihood for appealing to the customers as recommendations.

Bayesian-based content recommender 110 may be implemented by one or multiple network devices. For example, the network device(s) may include a computational device (e.g., a computer, a server, etc.). Bayesian-based content recommender 110 may provide user interfaces to customers. Bayesian-based content recommender 110 will be described further below.

Customer identifier 120 may identify a customer. Depending on the devices used by the customer to access and use the service(s) provided by service provider network 105, customer identifier 120 may identify the customer based on a manual log-in or automatically (e.g., based on one or more device identifier(s)). Customer identifier 120 may be implemented by one or multiple devices. For example, customer identifier 120 may include a computational device (e.g., a computer, a server, etc.). Customer identifier 120 will be described further below.

Customer premises 150 may include a location where customer(s) receive services from service provider network 105. For example, customers may receive services at home, at work, or other locations while customers are mobile. As illustrated, customer premises 150 may include devices that allow customers to receive services, such as, for example, television, mobile, and Internet from service provider network 105. As illustrated, customer premises 150 may include exemplary customer premise equipment, such as, for example, TVs 155, SPN TV interface devices 160, remote devices 165, and user devices 170.

TV 155 may include a device to display content. According to an exemplary embodiment, TV 155 may correspond to a television. According to other embodiments, TV 155 may correspond to other types of display devices, such as, for example, a monitor, a mobile device having a display, a laptop computer, user device 170, etc. According to an exemplary embodiment, TV 155 and SPN TV interface device 160 may be separate devices, as illustrated in FIG. 1. According to other embodiments, TV 155 may include SPN TV interface device 160 or include some of the functionalities associated with SPN TV interface device 160.

SPN TV interface device 160 may include a device that communicates with service provider network 105 to provide television services and/or content to a customer. According to an exemplary embodiment, SPN TV interface device 160 may include a client, a thin client, a set-top box, a converter box, a receiver, a server, a peer device, a tuner, and/or a digibox. According to an exemplary embodiment, SPN TV interface device 160 may also include a digital video recorder (DVR) and/or a hard drive. SPN TV interface device 160 may also provide multi-room services.

Remote device 165 may include a device that communicates with TV 155 and/or SPN TV interface device 160 to allow a customer to interact with SPN TV interface device 160 and/or TV 155. Remove device 165 may also include a device that communicates with other devices in communication with TV 155 and/or SPN TV interface device 160. Remote device 165 may include one or multiple input mechanisms (e.g., buttons, a display, a touchpad, a microphone, etc.) to receive a customer's input and, among other things, allow the customer to interact with TV 155 and/or SPN TV interface device 160. For example, remote device 165 may correspond to a remote control device (e.g., a set-top box controller, a TV controller, a converter box controller, etc.).

User device 170 may include, for example, a mobile device, a stationary device, a handheld device, a tablet device, or some other type of portable device. For example, user device 170 may include a computational device (e.g., a desktop computer, a laptop computer, a palmtop computer, etc.), or a communication device (e.g., a wireless phone, an Internet-access device, etc.). User device 170 may be capable of communicating with one or more devices in customer premises 150 and/or service provider network 105. Additionally, user device 170 may include one or more of the devices described in customer premises 150, such as, for example, TV 155, SPN TV interface 160, etc. According to an embodiment, user device 170 may correspond to, for example, a tablet device, a mobile communication device, or some other type of user device that is capable of remotely controlling SPN TV interface device 160 and/or TV 155.

Figure 2:
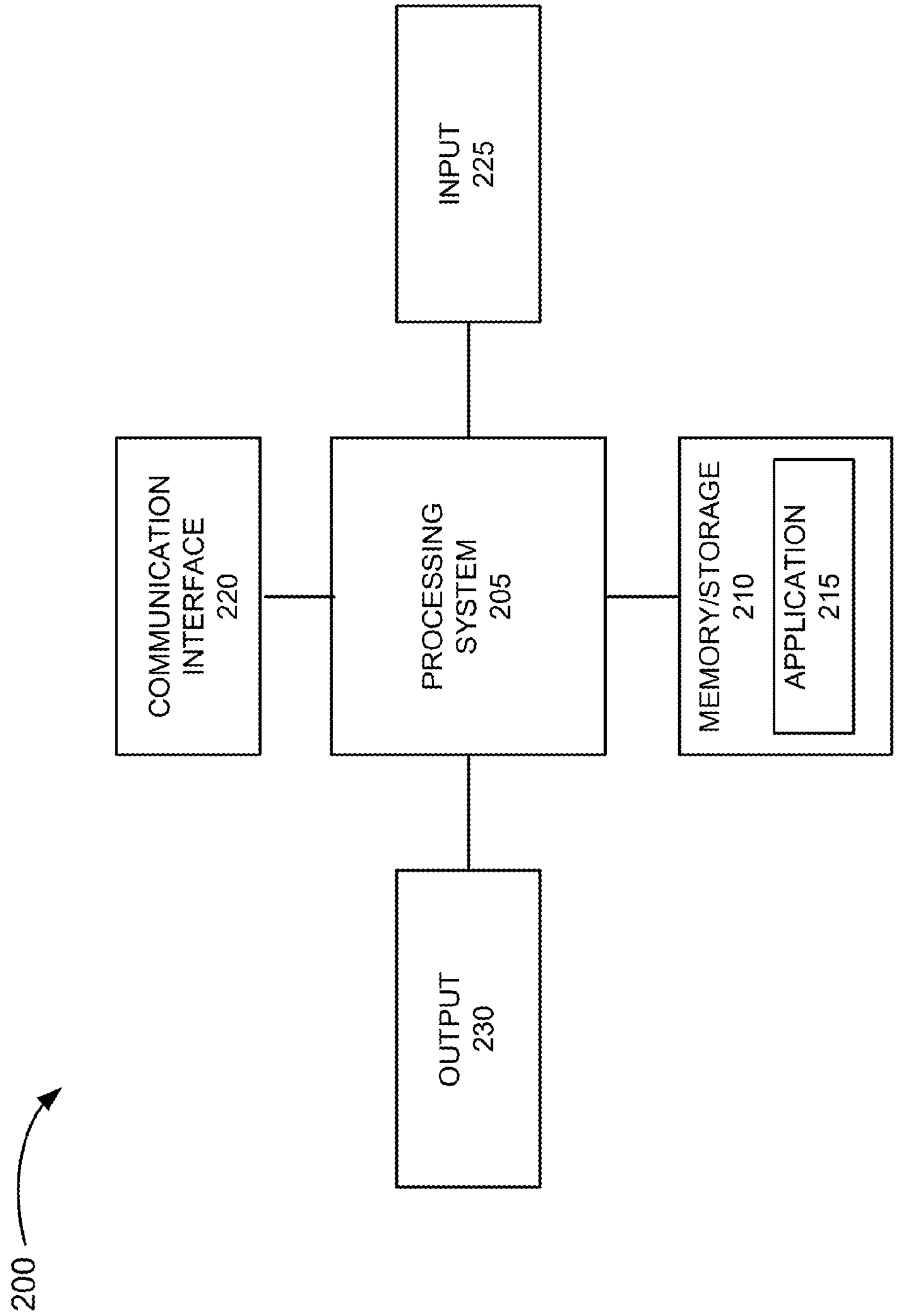
FIG. 2 is a diagram illustrating exemplary components of a device that may correspond to one or more of the devices in the environment depicted in FIG. 1.

FIG. 2 is a diagram illustrating exemplary components of a device 200 that may correspond to one or more of the devices in environment 100. For example, device 200 may correspond to one or more devices in service provider network 105 (e.g., Bayesian-based content recommender 110, customer identifier 120) and/or customer premises 150 (e.g., SPN TV interface device 160, remote device 165, user device 170). As illustrated, according to an exemplary embodiment, device 200 may include a processing system 205, memory/storage 210 including an application 215, a communication interface 220, an input 225, and an output 230. According to other embodiments, device 200 may include fewer components, additional components, different components, and/or a different arrangement of components than those illustrated in FIG. 2 and described herein.

Processing system 205 may include one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SOCs), central processing units, microcontrollers, and/or some other component that may interpret and/or execute instructions and/or data. Depending on the type of processing system 205, processing system 205 may be implemented as hardware, a combination of hardware and software, may include a memory (e.g., memory/storage 210), etc.

Processing system 205 may control the overall operation or a portion of operation(s) performed by device 200. Processing system 205 may perform one or multiple operations based on an operating system and/or various applications (e.g., application 215). Processing system 205 may access instructions from memory/storage 210, from other components of device 200, and/or from a source external to device 200 (e.g., a network, another device, etc.).

Memory/storage 210 may include one or multiple memories and/or one or multiple other types of tangible storage mediums. For example, memory/storage 210 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory, and/or some other type of memory.

Memory/storage 210 may include a hard disk (e.g., a magnetic disk, an optical disk, a magneto-optic disk, a solid state disk, etc.) or a floppy disk (e.g., a zip disk, etc.) and a corresponding drive, a tape, a Micro-Electromechanical System (MEMS)-based storage medium, and/or a nanotechnology-based storage medium. Memory/storage 210 may be external to and/or removable from device 200, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray® disk (BD), etc.). Memory/storage 210 may store data, application(s), and/or instructions related to the operation of device 200. Memory/storage 210 may store data, application(s), and/or instructions related to the operation of device 200.

Application 215 may include software or a program that provides various services and/or functions. For example, with reference to Bayesian-based content recommender 110, application 215 may include a content recommendation application or a content recommendation program for generating content recommendations based on the processes and/or functions described herein. Additionally, for example, with reference to customer identifier 120, application 215 may include a customer identifier application or a customer identifier program for identifying a customer. Additionally, for example, with reference to SPN TV interface device 160, application 215 may include an application or a program for providing content via TV 155, provide user interfaces, etc. Similarly, with reference to user device 170, application 215 may include an application or a program for providing content, user interfaces, etc.

Communication interface 220 may permit device 200 to communicate with other devices, networks, systems, etc. Communication interface 220 may include one or multiple wireless interfaces and/or wired interfaces. Communication interface 220 may include one or multiple transmitters, receivers, and/or transceivers. Communication interface 220 may operate according to one or multiple protocols, standards, and/or the like.

Input 225 may permit an input into device 200. For example, input 225 may include a keyboard, a mouse, a camera, a scanner, a microphone, a display, a touchpad, a button, a switch, an input port, voice recognition logic, fingerprint recognition logic, a web cam, and/or some other type of visual, auditory, tactile, etc., input component. Output 230 may permit an output from device 200. For example, output 230 may include a speaker, a display, a light, an output port, and/or some other type of visual, auditory, tactile, etc., output component.

As described herein, device 200 may perform processes in response to processing system 205 executing instructions (e.g., application 215) stored by memory/storage 210. By way of example, the instructions may be read into memory/storage 210 from another memory/storage 210 or from another device via communication interface 220. The instructions stored by memory/storage 210 may cause processing system 205 to perform one or more processes described herein. Alternatively, for example, according to other implementations, device 200 may perform one or more processes described herein based on the execution of hardware (processing system 205, etc.), the execution of hardware and firmware, or the execution of hardware, software, and firmware.

As previously described, Bayesian-based content recommender 110 may use metadata to identify features pertaining to content and generate recommendations. For example, Bayesian-based content recommender 110 may aggregate data and/or information pertaining to customers, content viewed, and upcoming content and store the data and/or information in the form of profiles. Alternatively, other devices may aggregate the data and/or information and make this data and/or information available to Bayesian-based content recommender 110. For example, service provider network 105 may include a data center that stores content for delivery to customers. For example, the data center may include a database center that stores television content and a publication server that publishes or pushes television content to a television distribution center (e.g., search servers that deliver content to customers, database cluster devices that store interactive programming guides, SPN TV interface device configuration data, customer profile data, etc., load balancer devices, etc.). Service provider network 105 may include devices to obtain tuner logs (e.g., from SPN TV interface device 160) to identify content viewed by a customer.

Figure 3:
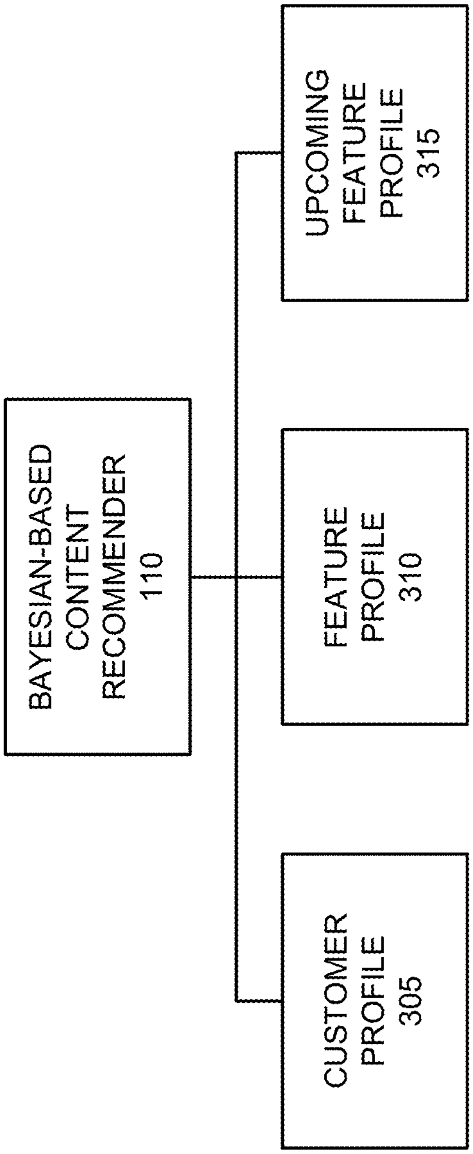
FIG. 3 is a diagram illustrating exemplary profiles used by the probabilistic-based content recommender to generate content recommendations.

FIG. 3 is a diagram illustrating exemplary profiles used by Bayesian-based content recommender 110 to generate content recommendations. As illustrated, Bayesian-based content recommender 110 may use a customer profile 305 (e.g., for each customer), a feature profile 310, and an upcoming feature profile 315.

Figure 4:
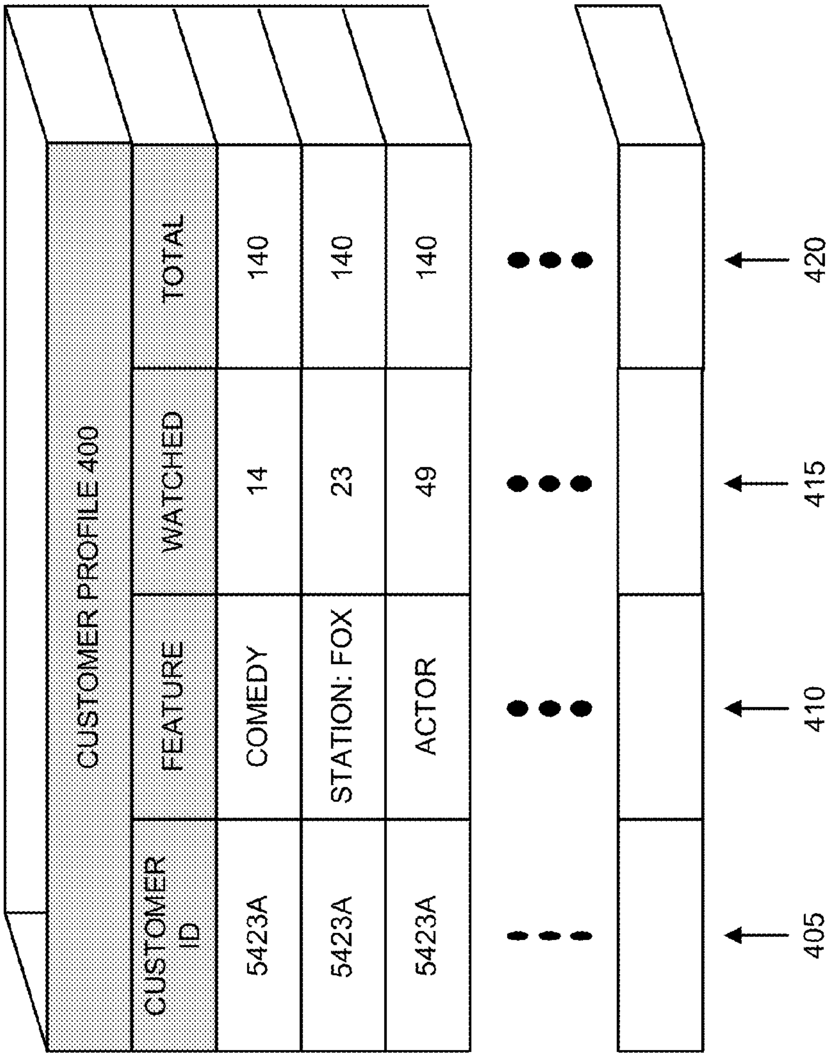
FIG. 4 is a diagram illustrating an exemplary customer profile.

Customer profile 305 may store data and/or information pertaining to contents viewed by a customer. As described further below, customer profile 305 may include data and/or information pertaining to features associated with contents viewed over a particular time period. FIG. 4 is a diagram illustrating an exemplary customer profile 400. As illustrated, customer profile 400 may include a customer identifier field 405, a feature field 410, a watched field 415, and a total field 420. According to other implementations, customer profile 400 may include additional fields, fewer fields, or different fields. For example, customer profile 400 may include a field that indicates a user preference pertaining to the importance of a particular feature (e.g., favorite actor, favorite plot, favorite genre, favorite sub-genre, etc.). Additionally, or alternatively, customer profile 400 may include a field that indicates a time period the customer viewed the content. For example, in some instances, the customer may not watch an entire television show or movie. This information may be used when calculating the probabilities pertaining to content viewed. For example, a weighting system may be applied in which content viewed in its entirety may be given more weight than content not viewed in its entirety. Additionally, or alternatively, customer profile 400 may include a program identifier field that includes a unique identifier for the content. While customer profile 400 is depicted as a table, according to other implementations, customer profile 400 may take the form of some other type of data structure.

Customer identifier field 405 may include a string (e.g., an alphanumeric string, such as "5423A," as illustrated in FIG. 4, or some other type of string (e.g., a numeric string, etc.)) that identifies the customer. For example, when a customer account for service includes multiple customers that view content, customer identifier field 405 may permit the viewing habits of a particular customer to be identified so that recommendations may be directed to a specific customer within the group of customers. As an example, a family may include multiple customers (e.g., a father, a mother, etc.).

Feature field 410 may include a string (e.g., a character string or some other type of string) that identifies a feature pertaining to content viewed by the customer identified in customer identifier field 405. For example, the feature may correspond to a particular type of metadata (e.g., title, broadcaster, air-time, air-date, program identifier, genre and/or sub-genre, cast and credit details, synopsis, etc.). For example, as illustrated in FIG. 4, feature field 410 may indicate "comedy" as a genre.

Watched field 415 may include a string (e.g., a numeric string or some other type of string) that identifies the number of content the customer viewed within the particular time period that corresponds to the feature identified in feature field 410. For example, as illustrated in FIG. 4, watched field 415 may indicate that "14" of the contents the customer viewed were of the comedy genre.

Total field 420 may include a string (e.g., a numeric string or some other type of string) that identifies the number of contents the customer viewed within the particular time period. For example, as illustrated in FIG. 4, total field 420 may indicate that "140" contents were viewed by the customer.

Figure 5:
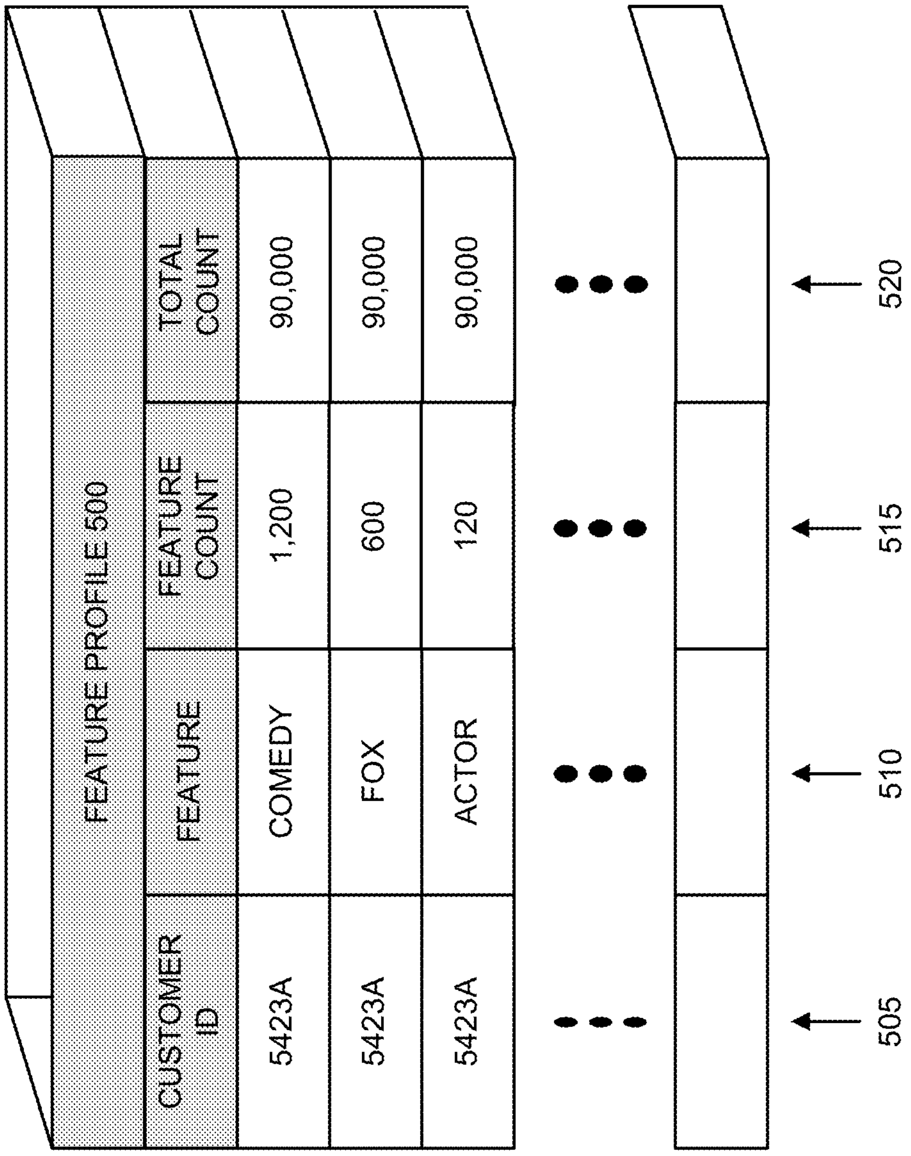
FIG. 5 is a diagram illustrating an exemplary feature profile.

Referring back to FIG. 3, feature profile 310 may store data and/or information pertaining to contents available to the customer. For example, feature profile 310 may include data and/or information pertaining to features associated with the contents available to the customer over the particular time period. FIG. 5 is a diagram illustrating an exemplary feature profile 500. As illustrated, feature profile 500 may include a customer identifier field 505, a feature field 510, a feature count field 515, and a total count field 520. According to other implementations, feature profile 500 may include additional fields, fewer fields, or different fields. For example, feature profile 500 may include a program identifier field that includes a unique identifier for the content. While feature profile 500 is depicted as a table, according to other implementations, feature profile 500 may take the form of some other type of data structure.

Customer identifier field 505 may include a string (e.g., an alphanumeric string, such as "5423A," as illustrated in FIG. 5, or some other type of string) that identifies the customer. For example, when a customer account for service includes multiple customers that view content, customer identifier field 505 may permit the viewing habits of a particular customer to be identified so that recommendations may be directed to a specific customer within the group of customers. Additionally, the string may be used to identify the type of subscription of service (e.g., television package, etc.) to ensure that the content available to the customer is properly identified.

Feature field 510 may include a string (e.g., a character string or some other type of string) that identifies a feature pertaining to content available to the customer during the particular time period. For example, the feature may correspond to a particular type of metadata (e.g., title, broadcaster, air-time, air-date, program identifier, genre and/or sub-genre, cast and credit details, synopsis, etc.). For example, as illustrated in FIG. 5, feature field 510 may indicate "comedy" as a genre.

Feature count field 515 may include a string (e.g., a numeric string or some other type of string) that identifies the number of contents that was available to the customer within the particular time period that corresponds to the feature identified in feature field 510. For example, as illustrated in FIG. 5, feature count field 515 may indicate that "1,200" of the contents available to the customer were of the comedy genre.

Total count field 520 may include a string (e.g., a numeric string or some other type of string) that identifies the number of contents available to the customer within the particular time period. For example, as illustrated in FIG. 5, total count field 520 may indicate that "90,000" contents were available to the customer (i.e., all types of contents).

Figure 6:
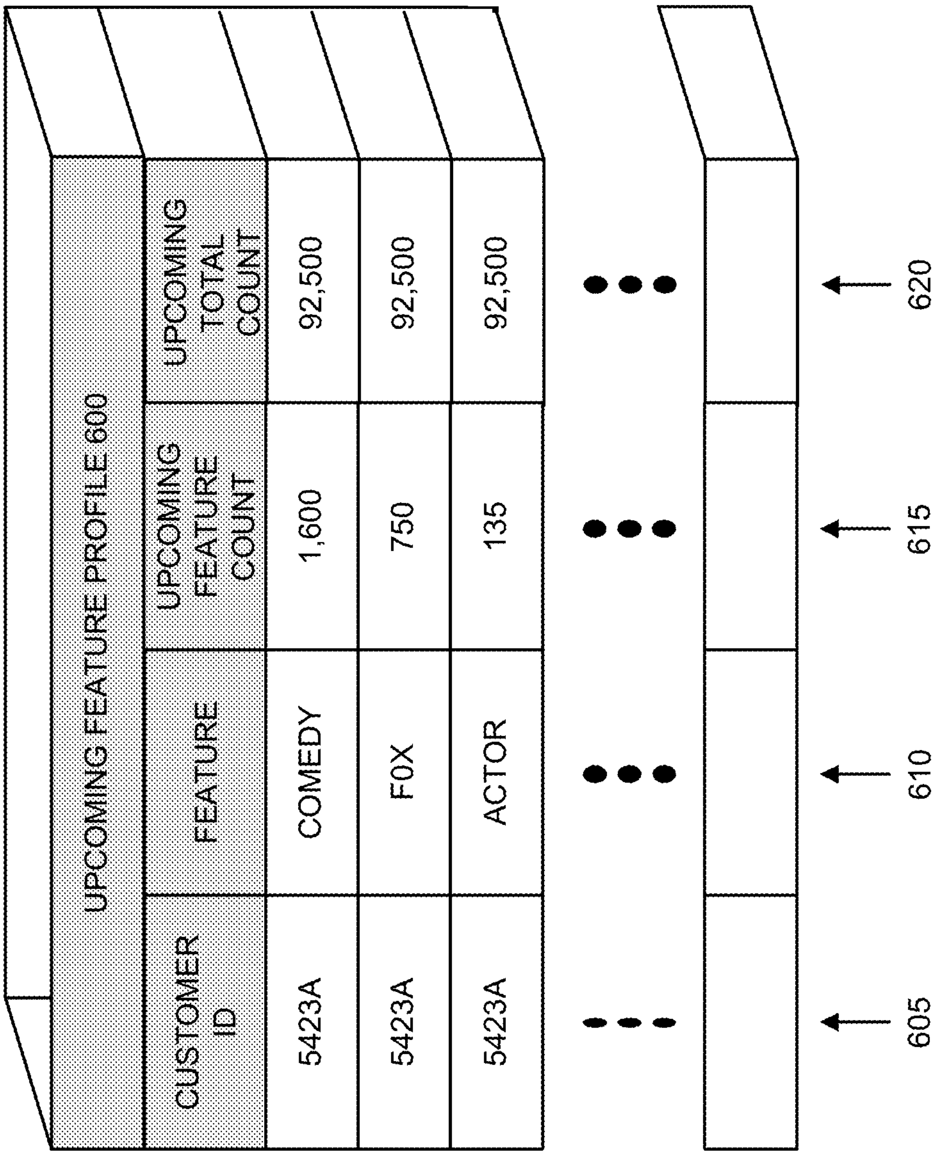
FIG. 6 is a diagram illustrating an exemplary upcoming feature profile.

Referring back to FIG. 3, upcoming feature profile 315 may store data and/or information pertaining to upcoming contents. As described further below, upcoming feature profile 315 may include data and/or information pertaining to features associated with the upcoming contents over a future time period. FIG. 6 is a diagram illustrating an exemplary upcoming feature profile 600. As illustrated, upcoming feature profile 600 may include a customer identifier field 605, a feature field 610, an upcoming feature count field 615, and an upcoming total count field 620. According to other implementations, upcoming feature profile 600 may include additional fields, fewer fields, or different fields. For example, upcoming feature profile 600 may include a program identifier field that includes a unique identifier for the content. While upcoming feature profile 600 is depicted as a table, according to other implementations, upcoming feature profile 600 may take the form of some other type of data structure.

Customer identifier field 605, feature field 610, upcoming feature count field 615, and upcoming total count field 620 may include strings that indicate data and/or information similar to that previously described for feature profile 500 except that the data and/or information pertains to upcoming contents.

Figure 7A:
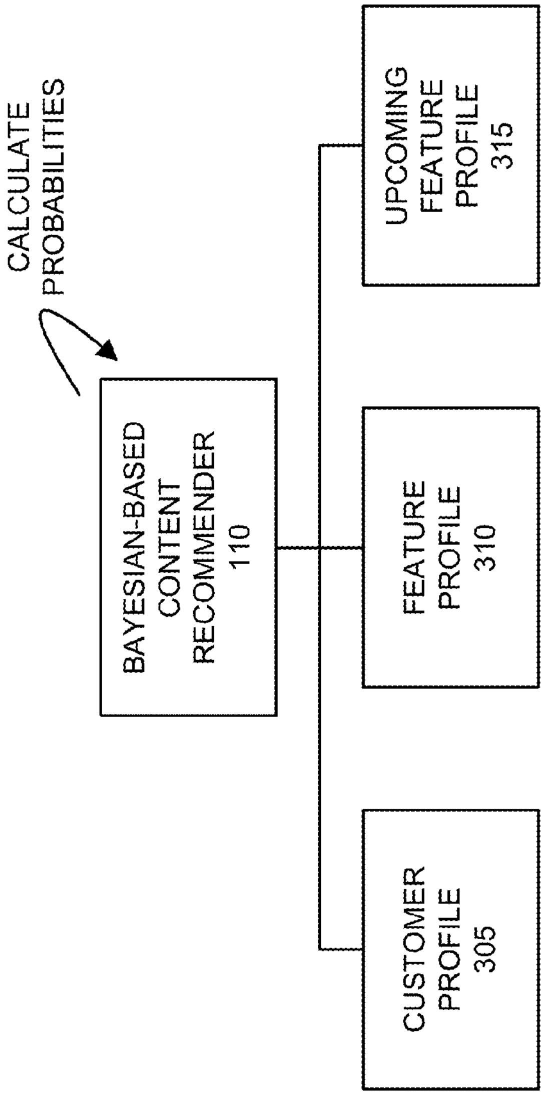
FIGS. 7A-7C are diagrams illustrating exemplary operations performed by the probabilistic-based content recommender for generating content recommendations.

Based on the profiles described above, Bayesian-based content recommender 110 may generate content recommendations. For example, according to an exemplary embodiment, as illustrated in FIG. 7A, Bayesian-based content recommender 110 may calculate probabilities based on customer profile 400 and feature profile 500 according to the following exemplary $$G_i = \left(\frac{watched_i}{\text{total watched}}\right) \Big/ \left(\frac{\text{feature } count_i}{\text{total count}}\right), \tag{1}$$

in which i indicates the feature of the content. Bayesian-based content recommender 110 may generate a $G_i$ for each feature applicable to a customer's viewing history. By way of example, and referring to FIGS. 4 and 5, the $G_i$ for the comedy genre is calculated according to the following expression:

$$G_i = \left(\frac{14}{140}\right) \Big/ \left(\frac{1{,}200}{90.000}\right). \tag{2}$$

As indicated by expressions (1) and (2), Bayesian-based content recommender 110 considers not only contents viewed by the customer, but also contents not viewed by the customer. Expressions (1) and (2) may be also expressed according to the following expression of probability:

$$G_i = p(f_i/C)/p(f_i), \tag{3}$$

in which i indicates the feature of the content and C indicates the content viewed by the customer.

Figure 7B:
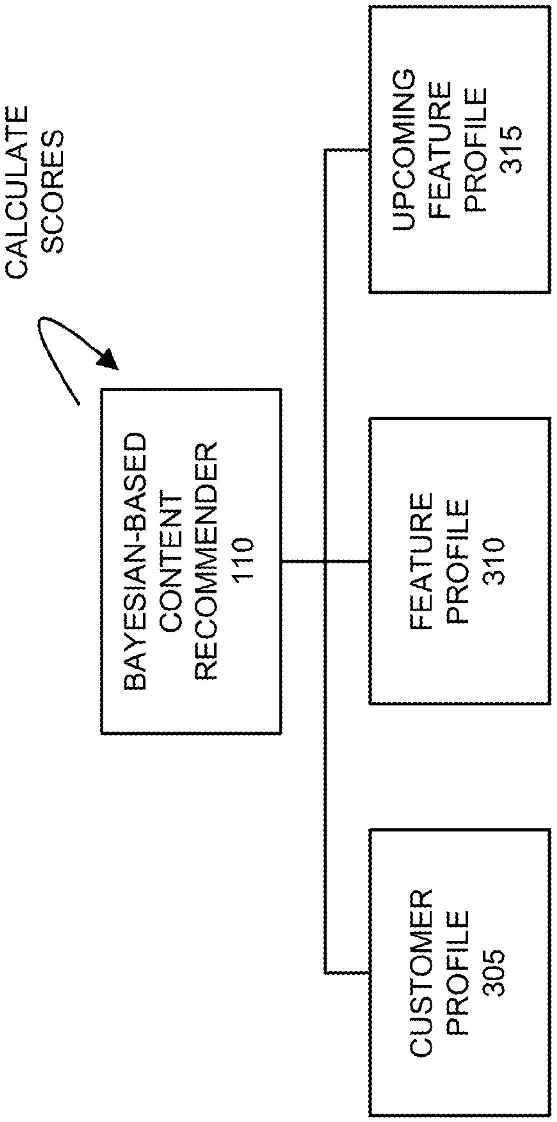

Referring to FIG. 7B, Bayesian-based content recommender 110 may calculate scores based on the probabilities calculated above. For example, Bayesian-based content recommender 110 may select features that are germane to the customer's viewing proclivities. Bayesian-based content recommender 110 may identify the features representative of the customer's viewing proclivities based on the features indicated by the probabilities associated with the content viewed by the customer. As an example, assume that some of the features indicative of the customer's viewing proclivities are content of the comedy genre and the actor Will Farrell. For a particular upcoming comedy movie starring Will Farrell, Bayesian-based content recommender 110 may calculate a score based on these features according to the following expressions:

$$G_1+G_2=\text{score}, \tag{4}$$

in which $G_1$ is the probability pertaining to the comedy genre for the content viewed and $G_2$ is the probability pertaining to the actor for the content viewed. Alternatively, other mathematical expressions may be implemented. For example, $G_1$ and $G_2$ may be multiplied, etc. The score is applied to each upcoming content that is of the comedy genre and includes the actor Will Ferrell.

Figure 7C:
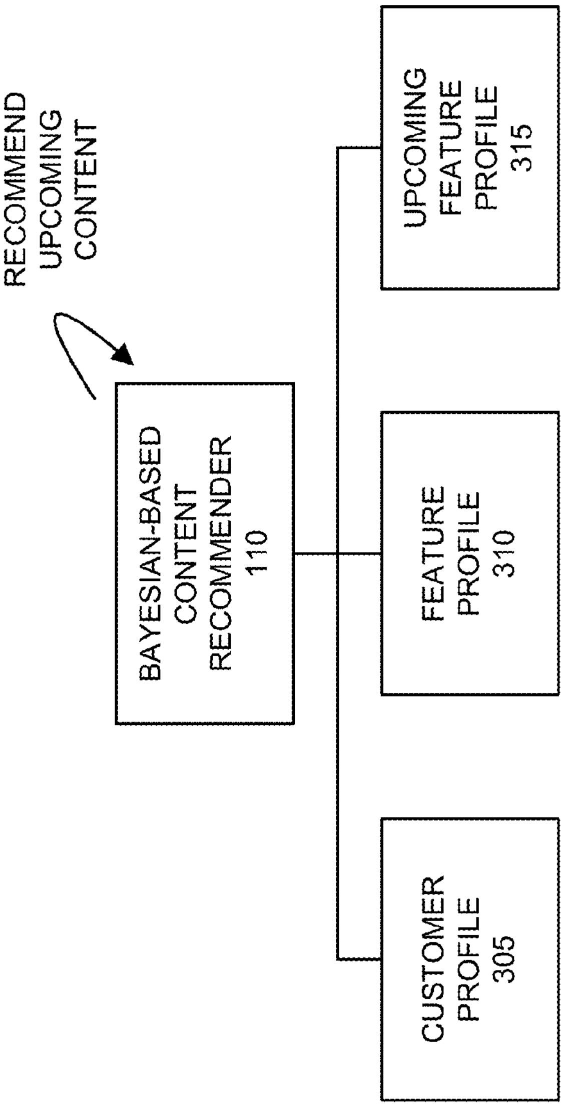

According to an exemplary embodiment, Bayesian-based content recommender 110 may calculate scores pertaining to features that are relevant based on the customer's viewing history (e.g., features applicable to content viewed by the customer). Based on the calculated scores, Bayesian-based content recommender 110 may select the upcoming content having the highest scores. For example, Bayesian-based content recommender 110 may be configured to select a certain number of contents or select contents that satisfy a threshold score. Referring to FIG. 7C, Bayesian-based content recommender 110 may then provide the customer with the selected content recommendations through a graphical user interface.

As an example, in the context of television service, Bayesian-based content recommender 110 may provide content recommendations to SPN TV interface device 160. For example, the content recommendations may be displayed to a customer via a widget, via an interactive programming guide (e.g., highlighting recommended content, etc.), or via some other portion of a graphical user interface system. According to another exemplary embodiment, the content recommendations may be provided to user device 170. For example, user device 170 may include a mobile application (e.g., a FIOS Mobile Remote application) that allows the customer to select from content recommendations and provide direct tune-in from user device 170 to a selected recommended content. The application may permit the customer to filter recommended content by genre, broadcast time, or other user-configurable parameters (e.g., favorite features, etc.). The application may also permit the customer to view content information (e.g., synopsis, genre, length, etc.) pertaining to recommended content. The application may be device agnostic and support other types of features (e.g., integrated TV information and Internet search, viewing options (e.g., by genre, etc.), and digital video recorder (DVR) capability.

Figure 8A:
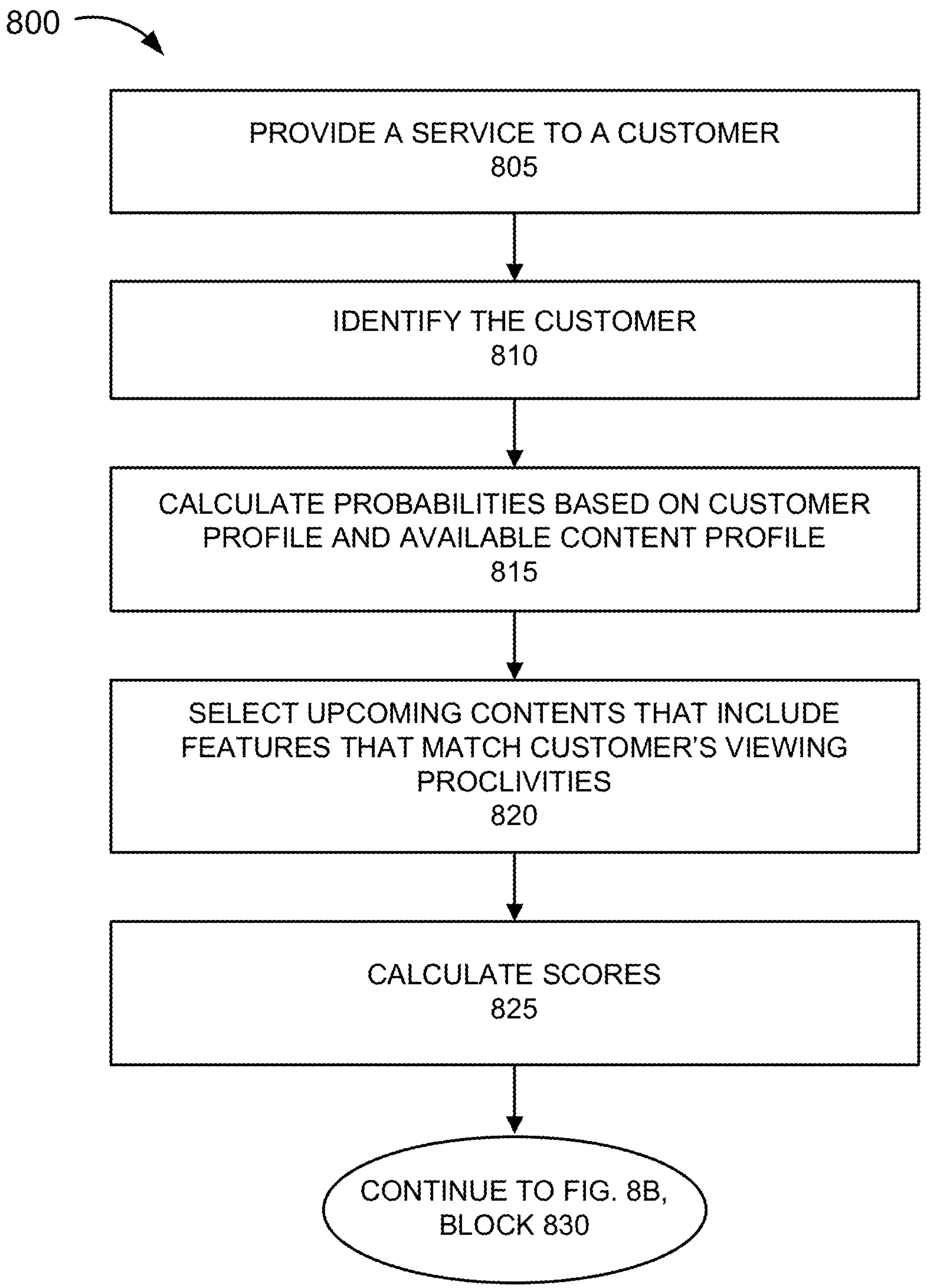
FIGS. 8A and 8B are flow diagrams illustrating an exemplary process for generating content recommendations.
Figure 8B:
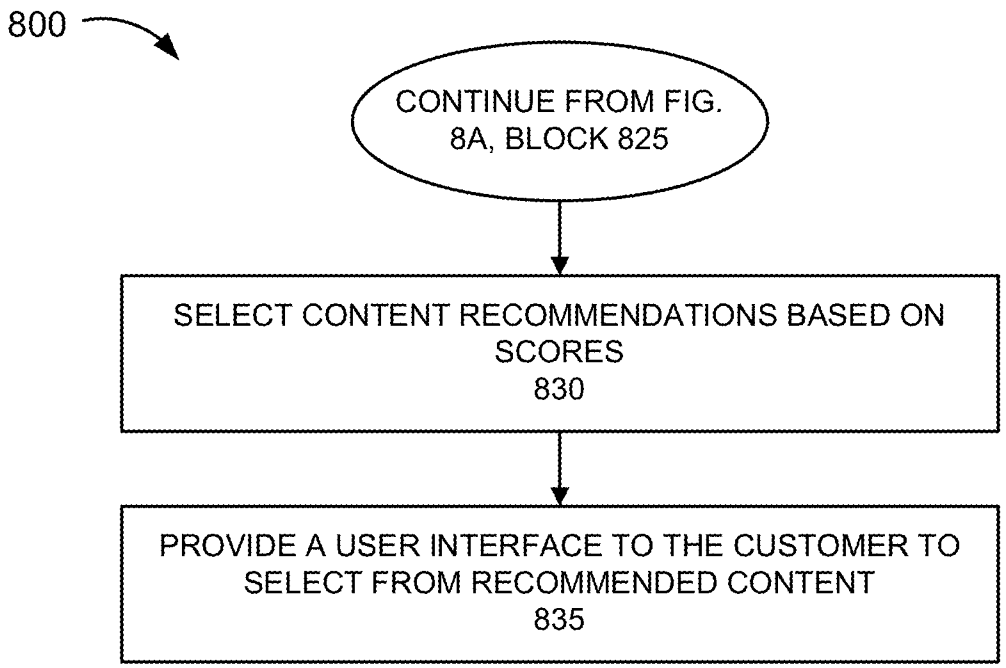

FIGS. 8A and 8B are flow diagrams illustrating an exemplary process 800 for providing content recommendations to a customer. Some of the steps in process 800 may be performed by customer identifier 120 and Bayesian-based content recommender 110. For example, processing system 205 may execute an application 215.

Referring to FIG. 8A, in block 805, service provider network 105 provides a service to a customer. For example, service provider network 105 provides a television service to the customer. Service provider network 105 may also provide other types of services (e.g., Internet and/or mobile service).

In block 810, customer identifier 120 identifies the customer. Customer identifier 120 may identify the customer automatically or based on manual input from the customer. As an example, when the customer uses his/her SPN TV interface device 160, a device identifier of the SPN TV interface device 160 may be obtained by customer identifier 120 to identify the customer. For example, the device identifier may be, for example, an equipment identifier and/or a network address (e.g., a media access control (MAC) address, an Internet Protocol (IP) address, etc.). Customer identifier 120 may identify the customer based on the device identifier. Additionally, or alternatively, when the customer uses his/her user device 170, a device identifier may be obtained. As an example, the customer may use user device 170 as a mobile remote (e.g., FIOS Mobile Remote) to control television service via SPN TV interface device 160.

In block 815, Bayesian-based content recommender 110 calculates probabilities based on customer profile 305 and feature profile 310. For example, as previously described, Bayesian-based content recommender 110 may calculate $G_a$s pertaining to features for each content viewed by the customer over a particular period of time. The contents viewed by the customer may include recommended content. A customer's viewing proclivities indicated by the content viewed and not viewed by the customer facilitates a self-learning process relative to the customer and by Bayesian-based content recommender 110.

In block 820, Bayesian-based content recommender 110 selects upcoming contents that include features that match the customer's viewing proclivities. For example, based on the features i, Bayesian-based content recommender 110 selects upcoming contents that include at least one of the features i. For example, the feature may correspond to a particular type of metadata (e.g., title, broadcaster, air-time, air-date, program identifier, genre and/or sub-genre, cast and credit details, synopsis, etc.).

In block 830, Bayesian-based content recommender 110 calculates scores for each upcoming content based on the selected features (i.e., content-viewed features) vis-à-vis the features of the upcoming contents. For example, Bayesian-based content recommender 110 may perform a summation or multiplication of relevant $G_i$s associated with an upcoming content to determine a score. By way of example, according to a previous scenario, if a particular upcoming content is of the comedy genre, the value of the $G_i$ would be $$G_i=\left(\frac{14}{140}\right)\Big/\left(\frac{1{,}200}{90.000}\right).$$

The value of any other applicable features would correspond to the $G_i$ previously calculated with respect to the content viewed by the customer. Thus, a score calculated for an upcoming content would be based on the value of each relevant $G_i$. As an example, the score may be equivalent to a summation of $G_i$ values, a multiplication of G values, etc.

Referring to FIG. 8B, in block 830, Bayesian-based content recommender 110 selects content to recommend based on the scores. For example, Bayesian-based content recommender 110 may select upcoming content that satisfies a threshold value or the top x number of contents.

In block 835, service provider network 105 may provide a user interface that provides to the customer the recommended content. For example, the recommended content may be made available to the customer via a widget, an interactive programming guide, a mobile remote application, or some other graphical user interface.

Although FIGS. 8A and 8B illustrate an exemplary process 800 for generating customer-specific recommendations, according to other embodiments, process 800 may include additional operations, fewer operations, and/or different operations than those illustrated in FIGS. 8A and 8B and described herein. Additionally, while process 800 is described with reference to exemplary devices (e.g., customer identifier 120, Bayesian-based content recommender 110), according to other embodiments, block(s) described in process 800 may be performed by a device or combination of devices other than those specifically mentioned.

The foregoing description of embodiments provides illustration, but is not intended to be exhaustive or to limit the embodiments to the precise form disclosed. Accordingly, modifications to the embodiments described herein may be possible.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The phrase "tangible readable medium" is intended to be broadly interpreted to include the storage mediums described in relation to memory/storage 210.

In addition, while a series of blocks has been described with regard to the process illustrated in FIGS. 8A and 8B, the order of the blocks may be modified according to other embodiments. Further, non-dependent blocks may be performed in parallel. Additionally, other processes described in this description may be modified and/or non-dependent operations may be performed in parallel.

An embodiment described herein may be implemented in many different forms of software, firmware, and/or hardware. For example, a process or a function may be implemented as "logic" or as a "component." The logic or the component may include hardware (e.g., processing system 205, etc.), a combination of hardware and software (e.g., application 215), a combination of hardware and firmware, or a combination of hardware, firmware, and software. An embodiment has been described without reference to the specific software code since the software can be designed to implement the embodiment based on the description herein.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded as illustrative rather than restrictive.

In the specification and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

No element, act, or instruction described in the present application should be construed as critical or essential to the embodiments described herein unless explicitly described as such.

What is claimed is:

1. A method comprising:
- providing a television service to customers;
- identifying a customer when the customer uses the television service;
- tracking content viewed by the customer;
- calculating probabilities based on the customer's viewing of contents, wherein the probabilities pertain to features applicable to the viewed contents and the features include plots of the viewed contents, and wherein content viewed in its entirety is given more weight than content not viewed in its entirety;
- selecting, based on the calculating, one or more upcoming contents, available at a future date to the customer, to recommend to the customer based on one or more features applicable to the upcoming contents that correspond to one or more features applicable to the viewed contents; and
- providing a user interface to permit the customer to select from the one or more upcoming contents recommended, wherein the features applicable to the viewed contents include one or more of title, broadcaster, air-time, air-date, program identifier, genre, sub-genre, cast information, credit information, language, or content rating, and the method further comprising:
- identifying the features applicable to the viewed contents based on metadata associated with the viewed contents, and wherein the calculating is based on the following expression:

$$G_i = \left(\frac{\text{watched}_i}{\text{total watched}}\right) \Big/ \left(\frac{\text{feature count}_i}{\text{total count}}\right),$$

in which i indicates a feature of a viewed content watched$_i$ indicates a number of viewed content that includes the feature i, total watched indicates a number of viewed content, feature count$_i$ indicates a number of content available that includes the feature i, and total count indicates a number of available content.

2. The method of claim 1, further comprising:
- storing a customer preference that indicates an importance of a feature to the customer; and wherein the calculating further comprises:
- calculating the probabilities based on the customer preference.

3. The method of claim 1, wherein the tracking further comprises:
- identifying a feature applicable to a viewed content;
- storing a number indicating how many viewed contents have the identified feature; and
- storing a number indicating a total of viewed contents
  - calculating the probabilities based on the stored number indicating how many viewed contents having the identified feature.

4. The method of claim 1, wherein the tracking further comprises:
- identifying a feature applicable to contents available to the customer for viewing;
- storing a number indicating how many available contents have the identified feature; and
- storing a number indicating a total of available contents.

5. The method of claim 1, further comprising:

identifying features applicable to the upcoming contents;

determining whether one or more of the identified features applicable to the upcoming contents match one or more of the one or more features applicable to the viewed contents; and calculating a score for one or more of the upcoming contents based on the one or more of the identified features when the one or more of the identified features match the one or more of the one or more features applicable to the viewed contents.

6. The method of claim 5, further comprising:

selecting one or more upcoming contents having a higher score relative to other upcoming contents; and recommending the one or more upcoming contents having the higher score.

7. The method of claim 1, further comprising:

identifying one or more features applicable to upcoming contents that correspond to the one or more features applicable to the viewed contents;

selecting one or more probability values corresponding to the calculated probabilities pertaining to the one or more features applicable to the viewed contents; and calculating scores for the upcoming contents based on the selected one or more probability values.

8. The method of claim 1, wherein the viewed contents include at least one of pay-per-view contents or video-on-demand contents; and wherein the providing comprises:

providing the one or more upcoming contents recommended to the customer via one of a widget, an interactive programming guide, or a mobile remote application.

9. A device comprising:

one or more memories to store instructions; and one or more processing systems to execute the instructions that configure the one or more processing systems to:

identify a customer when the customer uses the television service, wherein the customer is identified based on a manual login;

track content viewed by the customer;

calculate probabilities based on the customer's viewing of contents, wherein the probabilities pertain to features applicable to the viewed contents and the features include genres of the viewed contents, and wherein content viewed in its entirety is given more weight than content not viewed in its entirety;

select, based on calculated probabilities, one or more upcoming contents, available at a future date to the customer, to recommend to the customer based on one or more features applicable to the upcoming contents that correspond to one or more features applicable to the viewed contents; and output the one or more upcoming contents to another device as one or more content recommendations, wherein the features applicable to the viewed contents include one or more of title, broadcaster, air-time, air-date, program identifier, plot, sub-genre, cast information, credit information, language, or content rating, and wherein when calculating the probabilities, the one or more processing systems execute the instructions that further configure the one or more processing systems to calculate the probabilities based on the following expression:

$$G_i = \left(\frac{\text{watched}_i}{\text{total watched}}\right) \Big/ \left(\frac{\text{feature count}_i}{\text{total count}}\right),$$

in which i indicates a feature of a viewed content watched$_i$ indicates a number of viewed content that includes the feature i, total watched indicates a number of viewed content, feature count$_i$ indicates a number of content available that includes the feature i, and total count indicates a number of available content.

10. The device of claim 9, wherein the one or more processing systems execute the instructions that further configure the one or more processing systems to:

identify a feature applicable to a viewed content;

store a number indicating how many viewed contents have the identified feature; and store a number indicating a total of viewed contents.

11. The device of claim 9, wherein the one or more processing systems execute the instructions that further configure the one or more processing systems to:

identify a feature applicable to contents available to the customer for viewing;

store how many available contents have the identified feature; and store how many overall available contents.

12. The device of claim 9, wherein the one or more processing systems execute the instructions that further configure the one or more processing systems to:

identify features applicable to the upcoming contents;

determine whether one or more of the identified features applicable to the upcoming contents match one or more of the one or more features applicable to the viewed contents; and calculate a score for one or more of the upcoming contents based on the one or more of the identified features when the one or more of the identified features match the one or more of the one or more features applicable to the viewed contents.

13. The device of claim 12, wherein when calculating the score, the one or more processing systems execute the instructions that further configure the one or more processing systems to:

calculate a summation based on values pertaining to the matched one or more of the identified features; and select one or more upcoming contents having a higher score relative to other upcoming contents.

14. The device of claim 9, wherein the one or more processing systems execute the instructions that further configure the one or more processing systems to:

store a customer preference that indicates an importance of a feature to the customer; and calculating the probabilities based on the customer preference.

15. The device of claim 9, wherein the one or more processing systems execute the instructions that further configure the one or more processing systems to:

identify one or more features applicable to upcoming contents that correspond to the one or more features applicable to the viewed contents;

select one or more probability values corresponding to the calculated probabilities pertaining to the one or more features applicable to the viewed contents; and calculate scores for the upcoming contents based on the selected one or more probability values.

16. The device of claim 9, wherein the viewed contents include at least one of pay-per-view contents or video-on-demand contents.

17. A non-transitory readable medium storing instructions for:

identifying a customer when the customer uses a television service;

tracking content viewed by the customer;

calculating probabilities based on the customer's viewing of contents, wherein the probabilities pertain to features applicable to the viewed contents and the features include genres of the viewed contents, and wherein content viewed in its entirety is given more weight than content not viewed in its entirety;

selecting, based on the calculating, one or more upcoming contents, available at a future date to the customer, to recommend to the customer based on one or more features applicable to the upcoming contents that correspond to one or more features applicable to the viewed contents; and providing a user interface to permit the customer to select from the one or more upcoming contents recommended, wherein the features applicable to the viewed contents include one or more of title, broadcaster, air-time, air-date, program identifier, plot, sub-genre, cast information, credit information, language, or content rating, and the non-transitory computer-readable medium further storing instructions for:

identifying the features applicable to the viewed contents based on metadata associated with the viewed contents, and wherein the calculating is based on the following expression:

$$G_i = \left(\frac{\text{watched}_i}{\text{total watched}}\right) \bigg/ \left(\frac{\text{feature count}_i}{\text{total count}}\right),$$

in which i indicates a feature of a viewed content $\text{watched}_i$ indicates a number of viewed content that includes the feature i, total watched indicates a number of viewed content feature $\text{count}_i$ indicates a number of content available that includes the feature i, and total count indicates a number of available content.

18. The non-transitory readable medium of claim 17 further storing instructions for:

identifying features applicable to the upcoming contents;

determining whether one or more of the identified features applicable to the upcoming contents match one or more of the one or more features applicable to the viewed contents; and calculating a score for one or more of the upcoming contents based on the one or more of the identified features when the one or more of the identified features match the one or more of the one or more features applicable to the viewed contents.

19. The non-transitory readable medium of claim 17 further storing instructions for:

identifying one or more features applicable to upcoming contents that correspond to the one or more features applicable to the viewed contents;

selecting one or more probability values corresponding to the calculated probabilities pertaining to the one or more features applicable to the viewed contents; and calculating scores for the upcoming contents based on the selected one or more probability values.

20. The non-transitory readable medium of claim 17, further storing instructions for:

storing a customer preference that indicates an importance of a feature to the customer; and wherein the instructions for calculating further comprises instructions for:

calculating the probabilities based on the customer preference.

* * * * *